US012697778B2

(12) United States Patent
 Bae

(10) Patent No.: US 12,697,778 B2
(45) Date of Patent: Aug. 4, 2026

(54) METHOD AND SYSTEM FOR 3D PRINTER WITH DEFORMATION COMPENSATION

(71) Applicant: WHOBORN INC., Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 942 days.

(21) Appl. No.: 17/835,024

(22) Filed: Jun. 8, 2022

(65) Prior Publication Data

US 2022/0297384 A1 Sep. 22, 2022

Related U.S. Application Data

(63) Continuation-in-part of application No. 15/527,557, filed as application No. PCT/KR2015/012239 on Nov. 13, 2015, now Pat. No. 11,364,683.

(30) Foreign Application Priority Data

Dec. 31, 2014 (KR) ........................ 10-2014-0196088

(51) Int. Cl.
| | |
|---|---|
| *B29C 64/393* | (2017.01) |
| *B29C 64/209* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/393* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/393; B29C 64/209; B29C 64/364; B33Y 10/00; B33Y 30/00; B33Y 50/02
See application file for complete search history.

(56) References Cited

U.S. PATENT DOCUMENTS

| | | | | |
|---|---|---|---|---|
| 2017/0323150 A1* | 11/2017 | Miura | ..................... | G05B 17/02 |
| 2018/0095450 A1* | 4/2018 | Lappas | .................. | B33Y 10/00 |
| 2018/0186082 A1* | 7/2018 | Randhawa | ............. | B33Y 50/02 |
| 2021/0046710 A1* | 2/2021 | Koopmans | ............. | B33Y 10/00 |
| 2021/0279900 A1* | 9/2021 | Schwartz | ............. | A61B 5/1038 |
| 2024/0083116 A1* | 3/2024 | Chin | .................. | G05B 19/4099 |

* cited by examiner

*Primary Examiner* — Robert E Fennema
*Assistant Examiner* — Marzia T Monty

(57) ABSTRACT

A method for 3D printing includes receiving an exterior geometry of a product to be printed by a 3D printer; generating a structure that corresponds to the product and includes a plurality of unit structures therein; printing an object based on the structure; capturing at least one image of the object; and determining whether an exterior geometry of the object deviates from the structure by analyzing the at least one image. In response to determining that the exterior geometry of the object deviates from the structure, a command to correct deviation is generated.

20 Claims, 13 Drawing Sheets

10          20          15

The first component object and the second component
object are conflicted at (x2, y3, z1)

Lighting module

Power supply module

Input module

METHOD AND SYSTEM FOR 3D PRINTER WITH DEFORMATION COMPENSATION

CROSS-REFERENCE TO RELATED APPLICATIONS

This application is a Continuation-in-part of application Ser. No. 15/527,557 filed on May 17, 2017, which is a National Stage Entry of International Application No. PCT/KR2015/012239 filed on Nov. 13, 2015, which claims priority from Korean Application No. 10-2014-0196088 filed on Dec. 31, 2014. The aforementioned applications are incorporated herein by reference in their entireties.

TECHNICAL FIELD

The present invention relates to a 3D printer outputting method for mounting electrical components, and more particularly, to a 3D printer outputting method for mounting electrical components, wherein an electrical configuration or a work corresponding thereto is selected in a modeling for a general 3D printer and a direct simulation can thereby be performed, and by using such simulation, a product incorporating a circuit can be outputted by 3D printing.

RELATED ART

Recently, in the 3D printing technique, a technique in which a resultant object having a shape (external shape) is outputted, or a resultant object having moving portions in a shape is outputted has been applied.

SUMMARY

In related 3D printing techniques, when a 3D printing resultant object is to be electrically operated (i.e., when circuits or the like are included and should be enabled to be electrically operated), the circuits or the like should be mounted on the resultant object by separately using a PCB or the like after 3D printing. Therefore, when the resultant object is an electronic device, the present 3D printing technique generates a satisfactory external shape, but has difficulty in practically realizing the function.

A 3D printer outputting method for mounting electrical components according to an embodiment of the present invention includes: generating a structure forming unit structures; positioning component objects on the structure, wherein the positions of the component objects are changeable by using a coordinate system.

In an embodiment, when the component object is positioned on the structure, a main controller may allow the component object to be moved or allow the structure to be modified such that the component object is supported by the structure when the component object is not supported by the unit structures.

In an embodiment, when two or more component objects are positioned on the structure, if a portion at which component objects partially overlap each other is present, the main controller may adjust a position of the component object such that there is no overlapping portion.

In an embodiment, when a component object is to be inserted from outside during 3D printing, the main controller may make the external component object to be picked up by a pickup apparatus and may previously determine an inserting time point and an inserting position.

In an embodiment, when the external component is inserted by the pickup apparatus at pre-calculated time point and position, calculation may be performed such that the external component does not fall down.

In an embodiment, the inserting time point and the inserting position may vary according to a shape of the external component object.

In an embodiment, after the external component object is inserted, a time point and a position, at which remaining printing is performed with respect to other component objects which have already been formed, may be calculated.

In an embodiment, the main controller may guide a time point at which a component object is directly inserted manually for a 3D printer without pickup function.

In an embodiment, the main controller may allow a cover to be automatically generated for a replaceable component object while 3D printing is used.

In an embodiment, the main controller may allow a material different from a second component object to be generated in the vicinity of the component object to protect the component object. In an embodiment, in order to generate the different material in the vicinity of the second component object, a protective region surrounding the second component object may be generated on a first component object according to a position of the second component object, and one material to be used in the protective region may be assigned according to a preset condition.

In an embodiment, when the second component is doubly surrounded, a first region surrounding the second component object and a second region surrounding the first region may be provided, wherein the first and second regions may be assigned with materials different from each other.

In an embodiment, when a lamp is inserted into a first component object, a lamp position and a component type required therefor may be selectively disposed by using a well-known simulation program while considering light radiated from the lamp, and a power supply module for supplying a power source may be disposed according to types, numbers, and positions of specified lighting modules by using a well-known simulation program.

A 3D printer outputting method according to the present invention includes the step for generating a structure forming unit structures, wherein when the structure is generated, a space for component objects and/or circuit lines and/or a power source which are disposed at pre-calculated positions is freed and only the remaining structures are generated. In an embodiment, the step for generating a cover for covering the space to prevent damage to design and/or dusts may be further included.

An aspect of the present invention provides a method for 3D printing, which includes receiving, by a main controller, an exterior geometry of a product to be printed by a 3D printer; generating, by the main controller, a structure that corresponds to the product and includes a plurality of unit structures therein; printing, by the 3D printer, an object based on the structure; capturing, by one or more imaging devices, at least one image of the object; determining, by the main controller, whether an exterior geometry of the object deviates from the structure by analyzing the at least one image; and in response to determining that the exterior geometry of the object deviates from the structure, generating, by the main controller, a command to correct deviation.

In an embodiment, the method may further include receiving, by the main controller, one or more input variables that affect post-printing deformation characteristics; and generating, by the main controller, a compensated structure based on the one or more input variables. The compensated structure, when printed by the 3D printer, may cause the printed object to deform subsequent to printing to match the exterior geometry of the product.

In an embodiment, the one or more input variables may include a variable associated with a thermal property of printed material, or a variable associated with a mechanical property of the printed material, or both. Further, the one or more input variables may include one or more environmental parameters. By way of example, the one or more environmental parameters may include at least one of an ambient temperature, an ambient humidity, or an air circulation. The one or more environmental parameters may be monitored at least intermittently, and more particularly, the one or more environmental parameters may be monitored at regular intervals.

In an embodiment, the compensated structure may be generated based on vision analysis of relationship between the printed object, the generated structure, and the one or more input variables.

As aspect of the present invention provides a non-transitory computer readable medium containing program instructions executed by a processor or controller. The program instructions when executed by the processor or controller may receive an exterior geometry of a product to be printed by a 3D printer; generate a structure that corresponds to the product and includes a plurality of unit structures therein; cause the 3D printer to print an object based on the structure;

cause one or more imaging devices to capture at least one image of the object; determine whether an exterior geometry of the object deviates from the structure by analyzing the at least one image; and in response to determining that the exterior geometry of the object deviates from the structure, generate a command to correct deviation.

In an embodiment, the program instructions may be further configured to receive one or more input variables that affect post-printing deformation characteristics; and generate a compensated structure based on the one or more input variables. The compensated structure, when printed by the 3D printer, may cause the printed object to deform subsequent to printing to match the exterior geometry of the product.

In an embodiment, the one or more input variables may include a variable associated with a thermal property of printed material, or a variable associated with a mechanical property of the printed material, or both. Further, the one or more input variables may include one or more environmental parameters. By way of example, the one or more environmental parameters may include at least one of an ambient temperature, an ambient humidity, or an air circulation. The one or more environmental parameters may be monitored at least intermittently, and in an embodiment, the one or more environmental parameters may be monitored at regular intervals.

In an embodiment, the compensated structure may be generated based on vision analysis of relationship between the printed object, the generated structure, and the one or more input variables.

An aspect of the present invention also provides a 3D printing system, which includes a printing nozzle, a main controller, and one or more imaging devices that capture at least one image of the object. In particular, the main controller may be configured to receive an exterior geometry of a product to be printed with the printing nozzle; generate a structure that corresponds to the product and includes a plurality of unit structures therein; cause an object to be printed with the printing nozzle based on the structure; determine whether an exterior geometry of the object deviates from the structure by analyzing the at least one image captured by the one or more imaging devices; and in response to determining that the exterior geometry of the object deviates from the structure, generate a command to correct deviation.

In an embodiment, the main controller may be further configured to receive one or more input variables that affect post-printing deformation characteristics; and generate a compensated structure based on the one or more input variables. The compensated structure, when printed by the 3D printer, may cause the printed object to deform subsequent to printing to match the exterior geometry of the product.

In an embodiment, the one or more input variables may include a variable associated with a thermal property of printed material, or a variable associated with a mechanical property of the printed material, or both. The one or more input variables may further include one or more environmental parameters.

A 3D printer outputting method for mounting electrical components according to the present invention has an effect in that data about electrical components, data about electrical circuit disposition are inputted to a general 3D modeling data, and a main controller of a 3D printer calculates and controls the corresponding configuration to be automatically positioned according to the previously input data to configure a product, and thus, the component objects are disposed to prevent collision between the component objects.

In addition, the present invention has an effect in that in mounting component objects on a structure, collision portions or overlapping portions of component objects are identified by using a coordinate system, and whether the component objects are supported by unit structures is determined, and thus the collision or overlapping portions or unsupported portions are re-arranged at other positions by using the merits of 3D.

In addition, the present invention has an effect in that an actual component object is picked up by a well-known pickup apparatus so as to be automatically inserted, and for a 3D printer without a pickup function, a time point at which component objects can be directly inserted manually is provided to notify the time point.

In addition, the present invention has an effect in that materials different from those of the outer shapes of component objects are enabled to be applied inside and outside the component objects.

In addition, the present invention has an effect in that when a lighting or the like is realized by incorporating a lamp such as LED in an electrical configuration, the uniformity of light amount according to the design of a first component object and the application of a optimized light amount radiated when the lamp is disposed in the first component object can be designed.

In addition, the present invention has an effect in that post-printing deformation due to temperature variations and/or gravity can be corrected in real-time or in pseudo real-time. The post-printing deformation may also be predicted, and a compensated structure may be generated, to allow the resultant object to deform subsequent to the printing to match the exterior geometry of the product intended to be printed.

DETAILED DESCRIPTION

Figure 7:
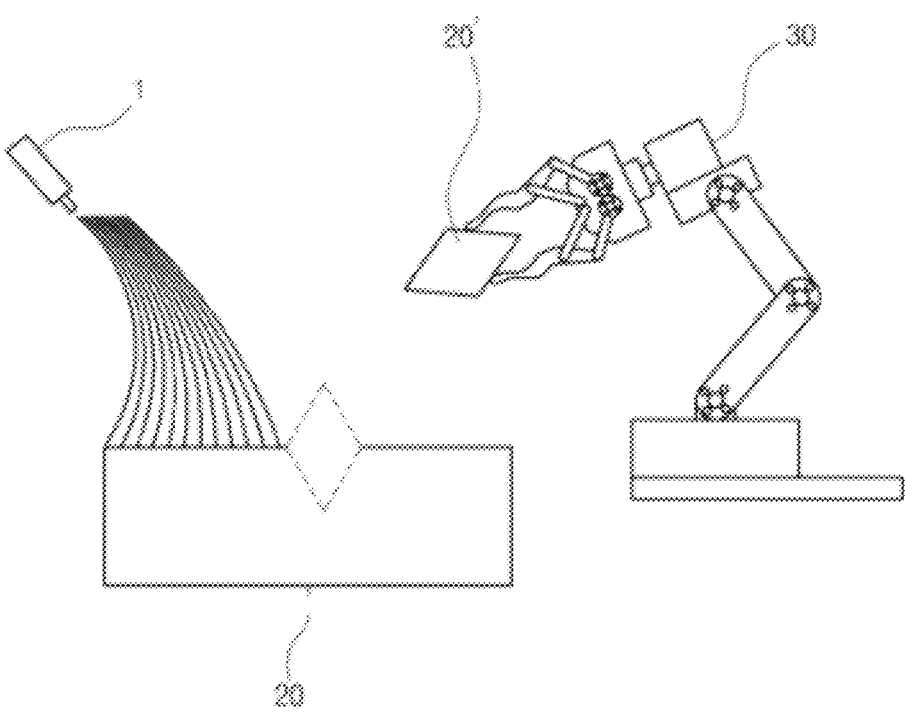
FIG. 7 is a configuration view of a state in which a component object is inserted by a pickup apparatus according to the present invention.
Figure 8:
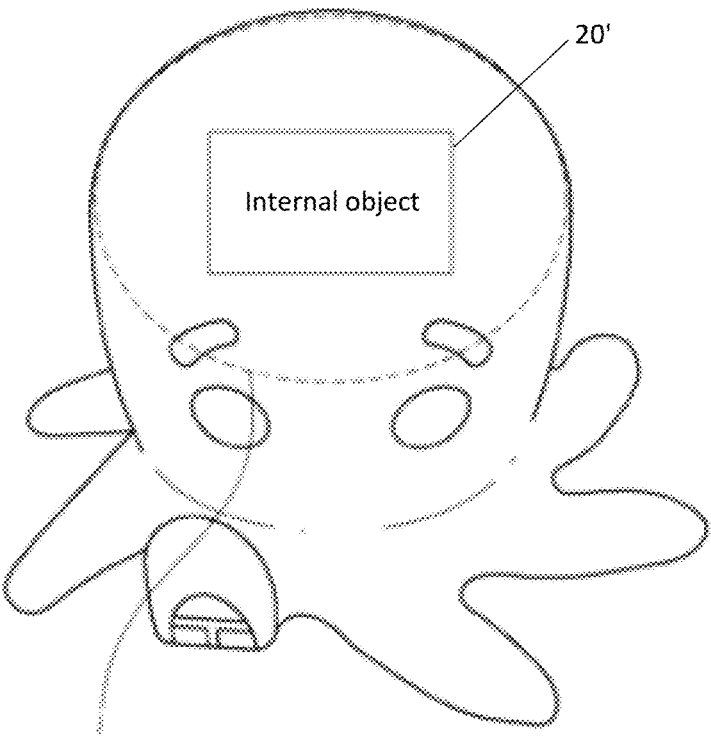
FIG. 8 is a perspective view illustrating a protective region for protecting external portions after inserting a second component object in a first component object according to the present invention.
Figure 9:
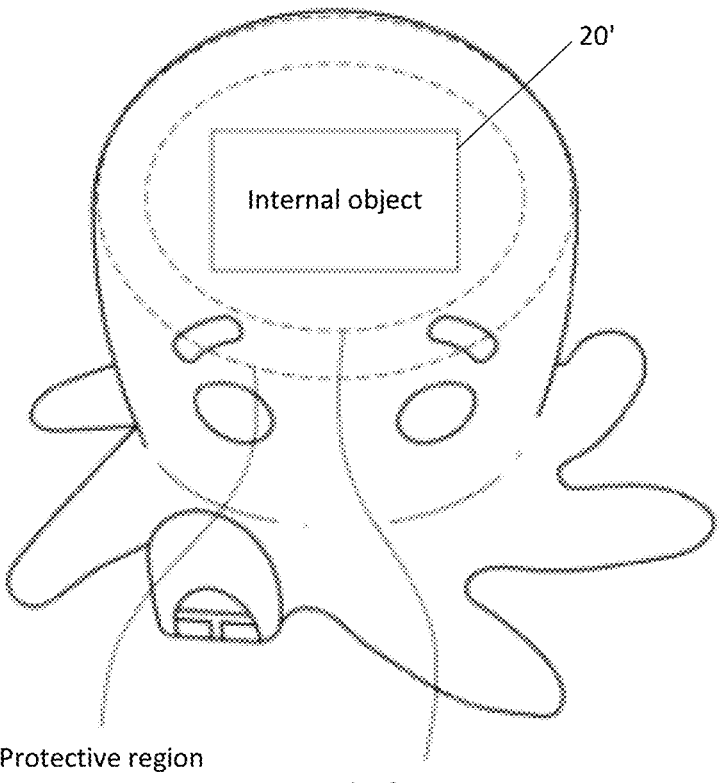
FIG. 9 is a perspective view illustrating a protective region for protecting external portions after inserting a second component object in a first component object according to the present invention.

Description will be presented with reference to FIGS. 7 to 9.

FIG. 7 illustrates a first component object 20. A second component object 20' is to be inserted in the component object 20, and when a process of surrounding the second component object 20' with a predetermined material is needed after the second component object 20' is inserted, a protective region (see FIG. 8) surrounding the second component object 20' may be generated according to the position of the second component object 20'.

According to preset conditions, one material may be assigned on the protective region and printed according to the assigned material.

Referring to FIG. 9, when the second component object 20' is doubly surrounded, a first region surrounding the second component object 20' and a second region surrounding the first region are provided, and the first and second regions may be assigned with materials different from each other. For example, the first region may be assigned with a rigid material, and the second region may be assigned with a flexible material.

Figure 10:
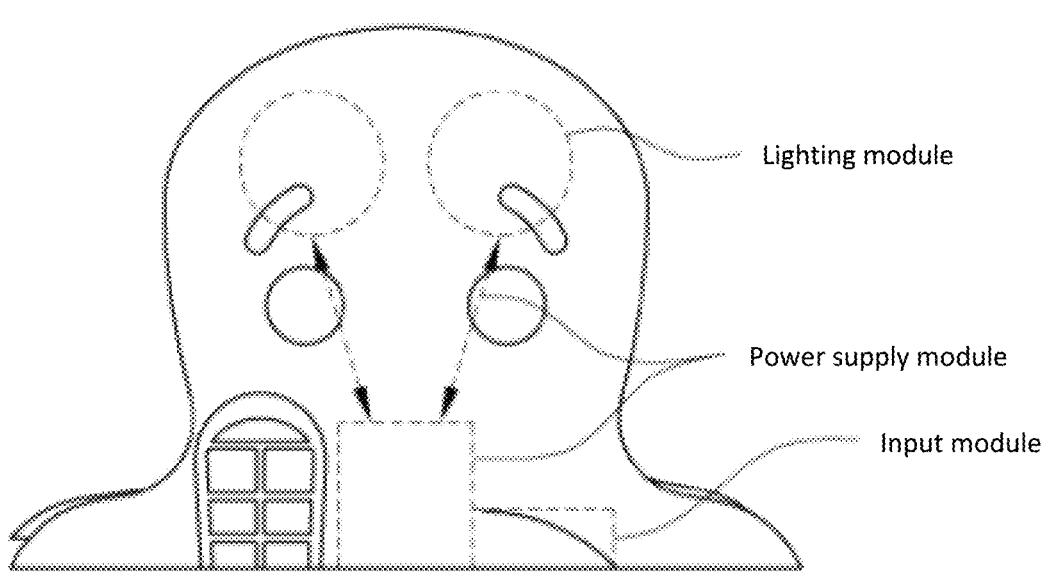
FIG. 10 is an external view of a component object in which a lamp is mounted according to the present invention.

Subsequently, referring to FIG. 10, when a lighting is realized by incorporating a lamp such as LED through an electrical circuit configuration, in order to apply the light amount uniformity according to the design of the first component object and the optimized amount of radiated light when lamps are disposed in the first component object

20, functions of automatically checking the light amount and arranging the lamps may be provided.

For example, considering a lighting function, when a well-known simulation program is used to incorporate the lamps into the first component object 20, it is necessary to calculate the number of output lamps required, where the lamps should be located for excellent radiation, what components are needed, and where the optimal position is. Considering light radiated at this time, an optimal position disposition and required kinds of components may be selected and disposed.

The well-known light amount simulation program and a main controller 100 cooperate with each other such that the first component object 20 is selected; a light amount radiated from the lamps for each region of the first component object 20 from the light amount simulation program is inputted; and at least any one of the thickness, material of the first component object 20 and the type, number, or position of lighting modules disposed inside is allowed to be set so that a specific amount of light is radiated for each region of the first component object 20. According to the type, number and position of the lighting modules specified as such, a power supply module for supplying power is disposed.

According to the above-described configuration, an embodiment of 3D printer outputting method for mounting electrical component according to the present invention will be described as follows.

Data about electrical component, data about electrical circuit disposition, and the like are inputted to a general 3D modeling data 110.

A main controller 100 of a 3D printer calculates and controls the corresponding configuration to be automatically positioned according to previously input data to thereby configure a product.

For example, a lattice internal structure 10 is formed to prevent the collisions between the positions of LED, battery, and micro-computer. Coordinate values are determined by a coordinate generating unit (a coordinate system 140) with the center point of a unit structure 15 of the structure 10 as a reference point.

When a component object 20 is mounted on the structure 10, the colliding or overlapping portion of the component object is identified by using the coordinate generating unit 140, and whether the component object 20 is supported by the unit structure 15 is determined, and the colliding or overlapping portions or unsupported portions are rearranged at other dimensions using merits of three-dimension.

In addition, in order to automatically insert the actual component object 20, the component object is picked up by a well-known pickup device 30, and the point in time and the position at which a second component object 20' is inserted in the first component object 20 are predetermined.

For a 3D printer without a pickup function, the time point at which the component object 20' can be directly inserted manually is provided to notify the time point, and a cover is automatically generated for replaceable component objects such as battery or LED, thereby preventing the designed external shape from being damaged.

In order to protect the component object, a material different from that of the external shape of the component object is applied to the inside and outside of the component object.

In the above configuration, when a lamp such as LED is incorporated to realize a lighting lamp, uniformity of light amount according to the design of the first component object 20 and the application of optimized light amount radiated when the lamp is disposed in the first component object 20 are designed.

Figure 11:
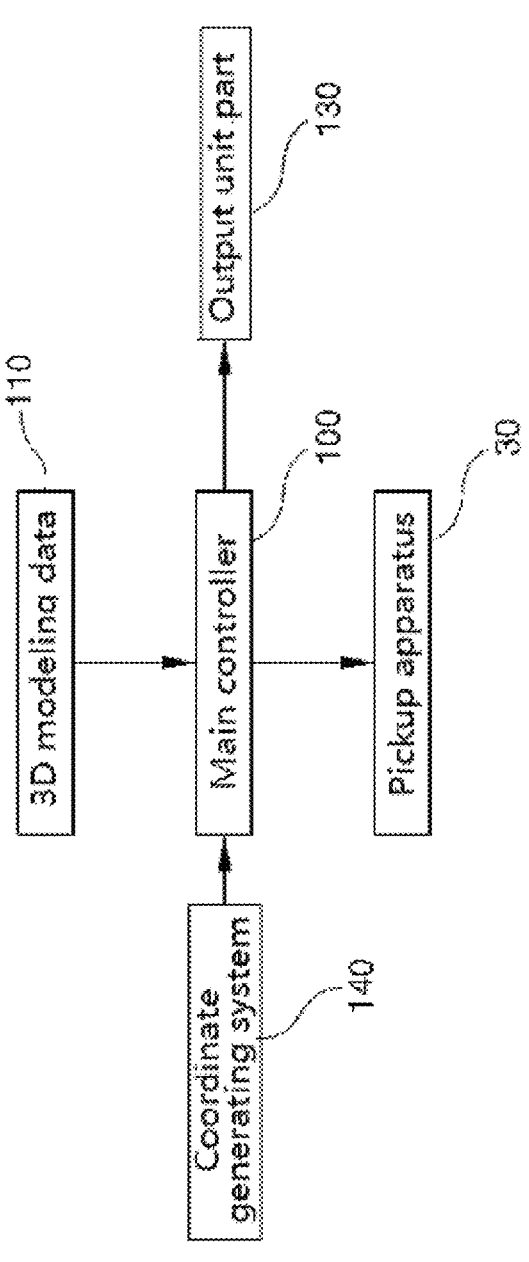
FIG. 11 is a block diagram of a 3D printer outputting system for mounting electrical components according to the present invention.

FIG. 11 illustrates a 3D printer output system for mounting electrical components.

When 3D modeling data 110 is read and is converted into a format for 3D printers (tool path format such as G-code), if a prepared specified configuration is selected in 3D modeling to realize a electrical configuration or functions corresponding thereto, the configuration is automatically positioned and configures a product according to the input data inputted by a main controller of a 3D printer, and 3D printing is performed through an output unit part 130.

For example, when an LED element is configured from among electrical configurations and an on/off function is needed in a specific condition, an LED, a battery, and a micro-computer and a circuit which controls the LED and the battery are required. To this end, the positions of the LED, battery, and the micro-computer should be set, and a circuit for connecting these should be configured.

At this time, the positions and circuit are automatically configured by the calculation of the main controller 100 which are inputted and preset from the 3D modeling data 110, and thus, a user may easily realize the electrical configuration. Here, an interface (UX-based GUI environment, etc.) is provided such that the positions of the LED and the inserting position of the battery may be changed by the user.

Figure 1:
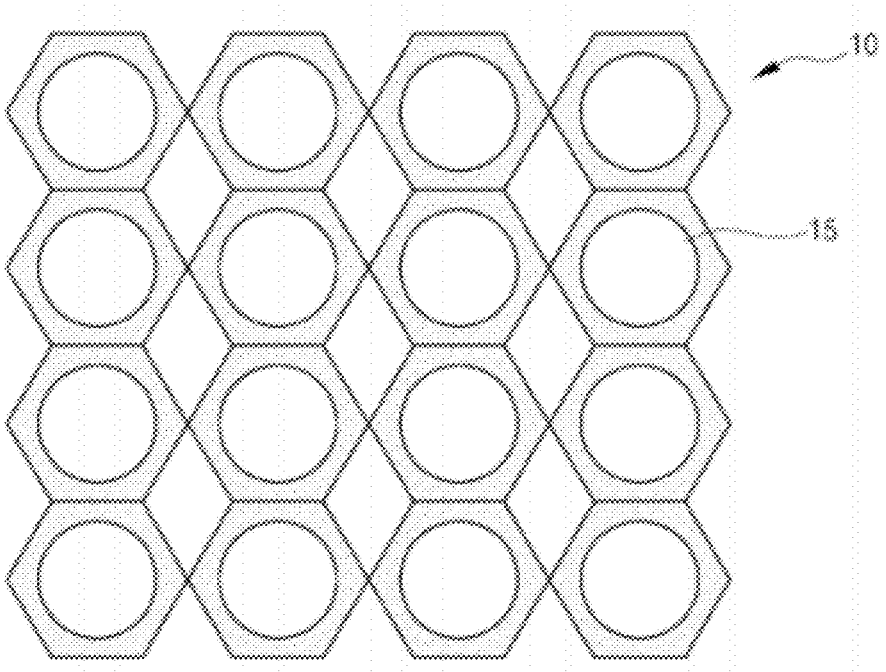
FIG. 1 is a plan view of a structure according to the present invention.

FIG. 1 illustrates a lattice internal structure 10 is formed to dispose the LED, the battery, and the micro-computer (hereinafter, referred to as "component objects") without collision between the positions the component objects.

In this document, the word "component objects" do not simply mean only the circuit but may mean objects including all of circuits required for electrical operations and/or electrical lines (wires) and/or power source (battery), etc.

The structure 10 is formed of a plurality of unit structures 15 having a predetermined shape.

The unit structure 15 of FIG. 1 has a hexagonal outer periphery and a circular inner diameter. Coordinate values are determined by a coordinate generating unit 140 with the center point of the unit structure 15 as a reference point. Thus, according to the unit structure of the structure, various types of coordinates may be generated.

As in the above cases, a resultant object may be printed while new unit structures are generated through 3D printing, and on the other hand, may be formed such that the LED, the battery, and component objects and a circuit line connecting these are disposed on the resultant object in which shapes have been already printed through 3D printing.

Figure 2:
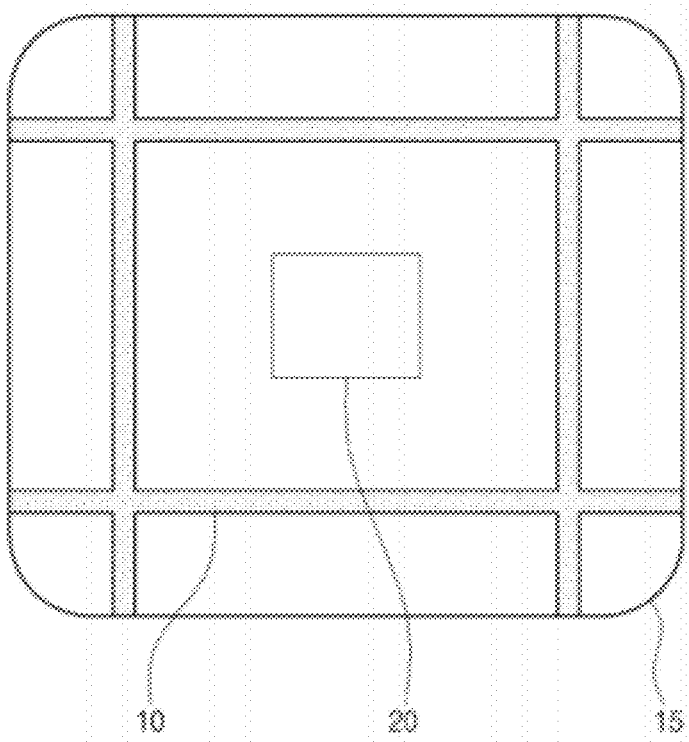
FIG. 2 is a plan view of a state in which a component object is inserted in a structure according to the present invention.
Figure 3:
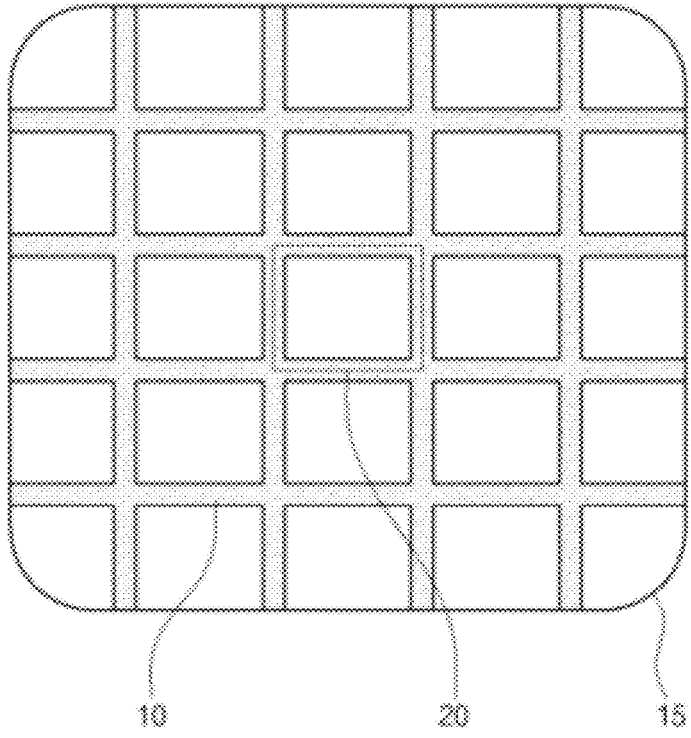
FIG. 3 is a plan view of a state in which a component object is inserted and supported in a structure according to the present invention.

Hereinafter, referring to FIGS. 2 and 3, a method will be described in which collision portions of component objects are identified by using a coordinate generation unit (coordinate system 140) and the collision portions are re-arranged in other dimensions by using merits of 3D.

Figure 4:
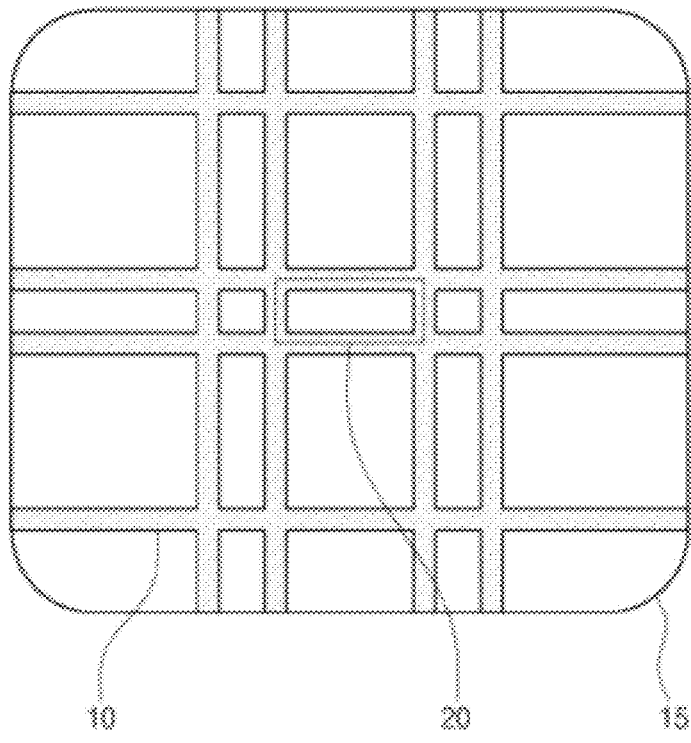
FIG. 4 is a plan view of a state in which a component object is inserted and supported in a structure according to the present invention.

In forming a structure 10, the structure 10 formed in a lattice shape is most desirable, and since having the lattice shape, the structure 10 has vacant spaces inside unit structures 15. A component object 20 is positioned on a structure 10. However, as illustrated in FIG. 2, since there is a case in which the component object 20 cannot be supported by a unit structure 15 because the component object 20 is smaller than the unit structure 15, a main controller 100 should determine whether the component object 20 is supported by the unit structure 15. In the determination method, a coordinate value is calculated. As a result of determination, when the component object 20 is not supported by the unit structure 15, the component object 20 is moved or the structure 10 is to be modified so as to be supported by the structure 10. In FIG. 4, unit structures 15 of a structure 10 are modified to be formed in various shapes, and one of the unit structures 15 is configured to support a component object 20.

Next, referring to FIGS. 5 and 6, a method will be described in which when portions at which component objects 20 overlap in a structure 10 are inspected by using a coordinate generation unit 140, and when there is an overlapping portion, the portion is adjusted so as not to overlap.

Figure 5:
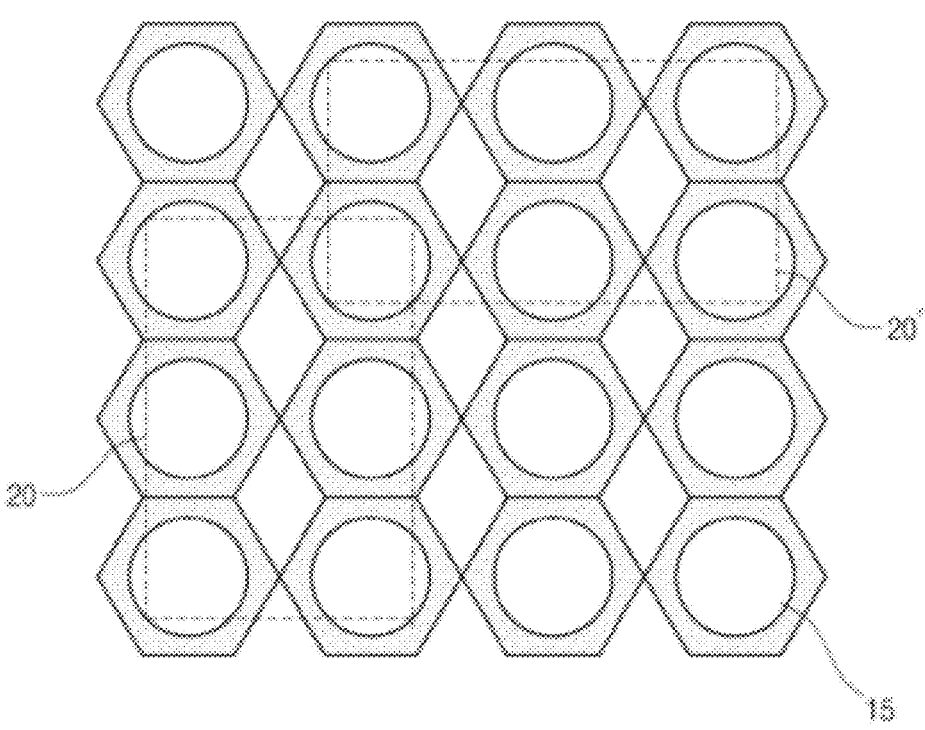
FIG. 5 is a plan view of a state in which two component objects are inserted and overlap with each other in a structure according to the present invention.
Figure 6:
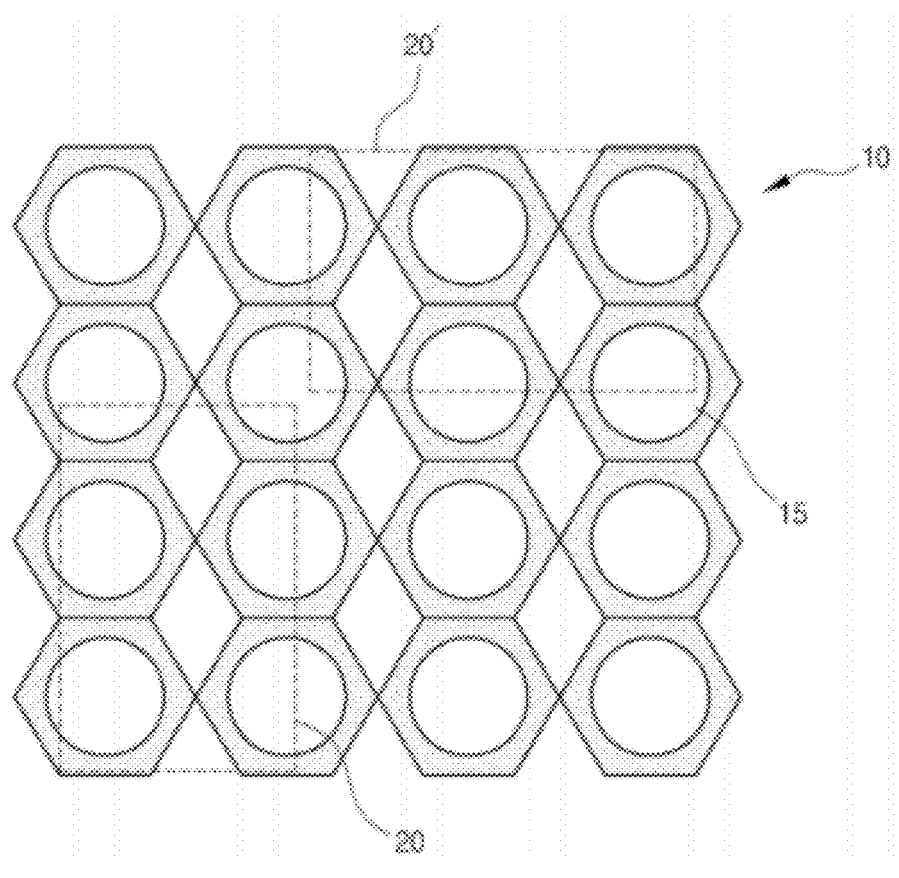
FIG. 6 is a plan view of a state in which two component objects are inserted and separated from each other in a structure according to the present invention.

Referring to FIG. 5, two component objects 20 and 20' partially overlap each other. Accordingly, the positions of the component objects 20 and 20' are adjusted with each other, the overlapping portion is removed as illustrated in FIG. 6.

The positions of the component object 20 is adjusted by using the coordinate generation unit 140 and then the component object 20 is positioned at a stable position.

When an actual 3D printer 1 outputs on the simulation formed as such, a pickup function of automatically inserting an actual component object 20 will be described with reference to FIG. 7.

In 3D modeling, when there is a case in which a first component object 20 and a second component object 20' are coupled, that is, when there is a case in which during the 3D printing of the first component object 20, the second component object 20' should be coupled from the outside, the second component object 20' should be picked up by a well-known pickup apparatus 30, and the time point and position for inserting the second component object 20' into the first component object 20 should be previously determined.

Next, during the 3D printing of the first component object 20, the second component object 20' is to be inserted by the pickup apparatus 30 at the pre-calculated time point and position. When the second component object 20' is inserted by the pickup apparatus 30 at the pre-calculated time point and position, it is important to make the second component object 20' not to deviate from a region.

In addition, since the time point and position of insertion vary according to the shape of the second component object 20', this should also be considered in calculation. Furthermore, after the second component object 20' is inserted, the time point and position of remaining printing with respect to the first component object 20 should be considered.

In order to reliably attach the above component object (or a circuit such as micro-computer) to an existing printed resultant object when the component object is inserted, an adhesive with a certain shape may be applied on the surface of the component object or the surface of the resultant object, and when a plurality of circuits are inserted, whether each circuit is electrically well connected may also be tested.

The 3D printing data in which the time point and position of pickup are calculated is outputted by an actual 3D printer 1.

For a 3D printer without a pickup function, the time point at which the component object 20' can be directly inserted manually is provided to notify the time point, and a cover is automatically generated for replaceable component objects such as battery or LED, thereby preventing the designed external shape from being damaged. At this time, the automatically generated cover is to be outputted in a detachable shape together or separately in another region when 3D printing is outputted.

For example, when a 3D resultant object having an LED lighting is formed by 3D printing, the LED lighting, a power source, switches and electrical lines (wires) for connecting the power source and the lighting should be inserted into the 3D resultant object.

Accordingly, when printing with a 3D printer cooperating with a pickup apparatus, if a position which is pre-calculated by a coordinate generation unit, and at which component objects or the like (including electrical lines (wires) and/or a power source) should be inserted is reached during printing, the pickup apparatus is operated to pick up the objects (an LED lighting, wires, a power source or the like) to be inserted in respective positions and position the objects at the corresponding positions, and a resultant object is thereby completed. (In this case, adhesives or the like may be used.)

Meanwhile, in case of a 3D printer which do not cooperate with a pickup apparatus, if a position which is pre-calculated by a coordinate generation unit, and at which component objects or the like should be inserted is reached during printing, unlike the above case, the size, volume, and position of respective components (which are calculated by the main controller or coordinate generation unit through receiving 3D printing data) are calculated, and the remaining portions except for spaces in which the components are inserted, are formed by 3D printing, and required components are inserted later in the space by a user and may be used.

At this time, since in the case as described above, the printed resultant object has a space which remains vacant and in which component objects or the like are inserted, the printed resultant object does not have an originally intended 3D shape and is weak against dust or other shocks. Accordingly, a cover for blocking dusts or the like while maintaining the original designed shape may be produced through the above-described method.

Meanwhile, for the protection of the objects and safety, various output materials are formed inside or outside to match usages and thereby improving the efficiency.

There are provided functions for protecting the component objects. By the functions, different flexible materials are formed between outer shapes of component objects and target output objects to protect the internal objects; and regions such as outer shapes of a sharp portion requiring safety or regions requiring damage prevention, waterproofness, electromagnetic wave blockage, or the like are automatically replaced with an output material according with the requirements.

For example, when a toy product having an electrical function is to be formed, the product should have an inner circuit, the outer appearance should not be sharp, and the product should not have problems of being inputted into a mouth or being wet, and should not be damaged when being thrown. To this end, the inside of the product brought into contact with component objects is formed with silicone, the outsides of the component objects are formed with a rigid plastic material which retains an external shape, and sharp portions are formed with flexible silicone to have an external shape and safety. In addition, when an elephant is designed, only nose portion can be replaced with silicone and thus the functionality of design is improved.

In a conventional 3D printer in which the above functions cannot be realized, the position at which an electrical circuit (micro-computer or the like) is to be disposed is calculated in advance through the connection to a coordinate generating unit (coordinate system 140), and 3D printing may be performed considering this.

In a related aspect of the present disclosure, the main controller 100 may be configured to correct and/or compensate for post-printing deformation. Due to, for example, temperature variations, drying, and/or gravity, the printed material may undergo deformation subsequent to being output from the printing nozzle. For instance, the material may cool down after being printed, resulting in contraction. As the solvent component evaporates from the material, the printed structure may shrink as well. Further, if the room temperature is varied or if there is unsteady air circulation during the printing, the degree of contraction may be non-uniform, resulting in more complex deformation. The weight of the structure exerting on itself may also lead to deformation of the structure.

Various factors may impact the post-printing deformation. By way of example, a temperature, a humidity, and/or an air circulation of in the room; thermal properties (e.g., thermal expansion coefficient, thermal conductivity) of the material; mechanical properties (e.g., modulus of elasticity, density) of the material; and overall weight and/or weight distribution of the structure are the factors that may affect the post-printing deformation.

Figure 12:
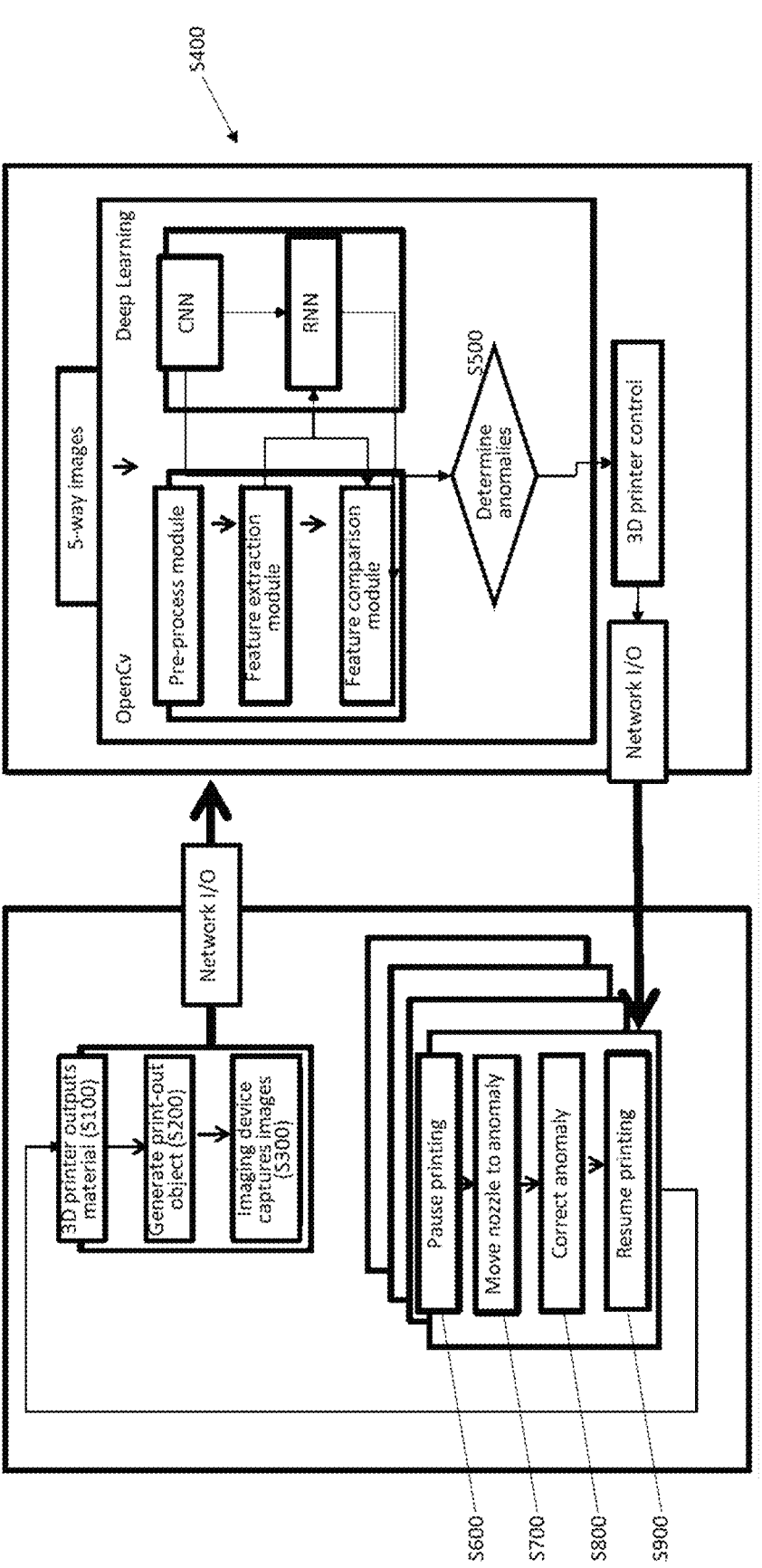
FIG. 12 is a flow chart describing correction of post-printing deformation.

The process of correcting or compensating for the deformation is described in FIG. 12. Referring to FIG. 12, the 3D printer 1 may output a material through a nozzle (S100) to generate at least a portion of a print-out object (S200). Thereafter, one or more imaging devices may capture images of the print-out object (S300). For instance, the one or more imaging devices may take 5-way images, e.g., front, back, left, right, and top. The 5-way images may be fed into the software running on the main controller 100, by which the 5-way images are processed based on a machine learning or a deep learning algorithm (S400). More specifically, the algorithm may utilize OpenCV, which is an open-source computer vision and machine learning software library, by which the 5-way images are processed through a pre-process module 402, feature-extraction module 404, and extracted feature comparison module 406. In some implementations, the pre-process module 402 may be based on a convolutional neural network (CNN), and the feature extraction and comparison modules 404 and 406 may be based on a recurrent neural network (RNN). However, the present disclosure is not limited thereto, and various other machine learning or deep learning algorithms may be utilized.

The processed data may be used in determining whether any anomalies or deviations exist in the print-out object (S500). In response to determining that the exterior shape of the printed object deviates from the originally intended product, the main controller 100 may cause the 3D printer 1 to perform a correction mode. In the correction mode, the 3D printer 1 may pause the printing (S600), move the printing nozzle to the location of anomaly (S700), and correct the deviation in accordance with correction conditions (S800). Thereafter, the 3D printer 1 may resume the printing (S900). By way of example, the correction conditions may include adding material to allow the resultant object to correspond to the intended product. In some implementations, in case the deviation is to be corrected by removing excess material, the main controller 100 may alert the operator of the 3D printer that the excess material should be removed manually by the operator before the printing resumes. In some other implementations, the main controller 100 may inform the locations to the operator where the excess material should be removed manually after the printing is finished.

According to the present disclosure, the artificial intelligence (AI) may be trained to determine deformation of the structure due to, e.g., thermal contraction, thermal expansion, thermal deformation, and/or deformation due to gravitational loads, based on the vision. Since any anomalies and/or deviations may be corrected during the printing process in real-time or pseudo real-time without intervention of a human operator, waste of material and/or time may be prevented In some embodiments, once the AI has been trained with sufficient data sets, the main controller 100 may be configured to compensate for the post-printing deformation based on a predictive model. More specifically, in order to compensate for the post-printing deformation and to print out a product that has dimensions more accurate to the dimensions of the target model, the main controller 100 may be configured to generate a compensated model and may be configured to cause the 3D printer 1 to print out the compensated model, which eventually deforms to the intended original model.

Figure 13:
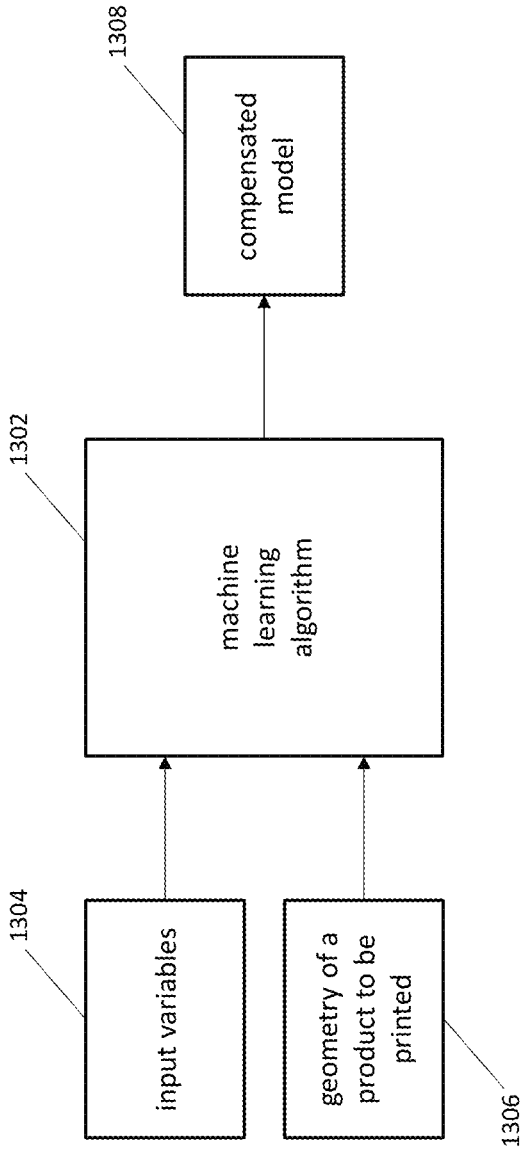
FIG. 13 is a diagram schematically describing a machine learning algorithm to generate a compensated model based on prediction of post-printing deformation.

The compensated model may be generated based on the machine learning as discussed above. For example, as shown in FIG. 13, the machine learning algorithm 1302 (executable by the main controller 100) may take input variables 1304 and an exterior geometry of a product 1306 as model inputs, and may output the compensated model 1308 as a model output. In some embodiments, the input variables 1304 may include material properties and/or environmental parameters. The environmental parameters may include ambient temperature, ambient humidity, air circulation in the room, or the like. As such, the input variables 1304, especially the environmental parameters, may be updated at least intermittently during the printing process. In some implementations, the environmental parameters may be updated at regular intervals. In some such implementations, various sensors, e.g., a temperature sensor, a humidity sensor, an anemometer, or the like, may be included in the 3D printing system to obtain the environmental parameters.

Features described herein are merely some embodiments for implementing 3D printer outputting methods. The present invention is not limited to the present embodiments but as claimed in the scope of the claims below, the technical spirit of the present invention would be within the range such that any one skilled in the art belonging to the present invention could make various changes and modifications could be made within the scope of the present invention.

Since the present invention relates to a 3D printer outputting method for mounting electrical components and to a technique for using 3D printers and has thus industrial applicability.

What is claimed is:

1. A method for three-dimensional (3D) printing, comprising:

receiving, by a main controller, an exterior geometry of a product to be printed by a 3D printer;

generating, by the main controller, a structure that corresponds to the product and includes a plurality of unit structures therein;

printing, by the 3D printer, an object based on the structure;

capturing, by one or more cameras, at least one image of the object;

determining, by the main controller, a deviation of an exterior geometry of the object from the structure by analyzing the at least one image;

receiving, by the main controller, one or more input variables that affect post-printing deformation characteristics; and generating, by the main controller, a compensated structure based on the deviation and the one or more input variables, wherein the compensated structure, when printed by the 3D printer, causes the printed object to deform subsequent to printing to match the exterior geometry of the product, wherein the one or more input variables include:
one or more variables associated with at least one of a thermal property or a mechanical property of printed material; and
one or more environmental parameters including at least one of an ambient temperature, an ambient humidity, or an air circulation.

2. The method of claim 1, wherein the one or more cameras take 5-way images, which includes front, back, left, right, and top images of the object.

3. The method of claim 2, wherein the 5-way images are processed by the main controller based on a machine learning algorithm.

4. The method of claim 3, wherein the machine learning algorithm is based on at least one of a convolutional neural network (CNN) or a recurrent neural network (RNN).

5. The method of claim 1, wherein the one or more environmental parameters are monitored at least intermittently.

6. The method of claim 5, wherein the one or more environmental parameters are monitored at regular intervals.

7. The method of claim 1, wherein the compensated structure is generated based on the deviation between the printed object and the generated structure, which is detected using the one or more cameras, by compensating for impacts of the one or more input variables.

8. A non-transitory computer readable medium containing program instructions executed by a processor or controller, the program instructions when executed by the processor or controller configured to:

receive an exterior geometry of a product to be printed by a three-dimensional (3D) printer;

generate a structure that corresponds to the product and includes a plurality of unit structures therein;

cause the 3D printer to print an object based on the structure;

cause one or more cameras to capture at least one image of the object;

determine a deviation of an exterior geometry of the object from the structure by analyzing the at least one image;

receive one or more input variables that affect post-printing deformation characteristics; and generate a compensated structure based on the deviation and the one or more input variables, wherein the compensated structure, when printed by the 3D printer, causes the printed object to deform subsequent to printing to match the exterior geometry of the product, wherein the one or more input variables include:
one or more variables associated with at least one of a thermal property or a mechanical property of printed material; and
one or more environmental parameters including at least one of an ambient temperature, an ambient humidity, or an air circulation.

9. The non-transitory computer-readable medium of claim 8, wherein the one or more cameras take 5-way images, which includes front, back, left, right, and top images of the object.

10. The non-transitory computer-readable medium of claim 9, wherein the 5-way images are processed by the main controller based on a machine learning algorithm.

11. The non-transitory computer-readable medium of claim 10, wherein the machine learning algorithm is based on at least one of a convolutional neural network (CNN) or a recurrent neural network (RNN).

12. The non-transitory computer-readable medium of claim 9, wherein the one or more environmental parameters are monitored at least intermittently.

13. The non-transitory computer-readable medium of claim 12, wherein the one or more environmental parameters are monitored at regular intervals.

14. The non-transitory computer-readable medium of claim 9, wherein the compensated structure is generated based on the deviation between the printed object and the generated structure, which is detected using the one or more cameras, by compensating for impacts of the one or more input variables.

15. A three-dimensional (3D) printing system, comprising:

a printing nozzle;

a main controller configured to:

receive an exterior geometry of a product to be printed with the printing nozzle;

generate a structure that corresponds to the product and includes a plurality of unit structures therein; and cause an object to be printed with the printing nozzle based on the structure; and one or more cameras that capture at least one image of the object, wherein the main controller is further configured to:

determine a deviation of an exterior geometry of the object deviates from the structure by analyzing the at least one image captured by the one or more cameras; and receive one or more input variables that affect post-printing deformation characteristics; and generate a compensated structure based on the deviation and the one or more input variables, wherein the compensated structure, when printed by the 3D printer, causes the printed object to deform subsequent to printing to match the exterior geometry of the product, and wherein the one or more input variables include:

one or more variables associated with at least one of a thermal property or a mechanical property of printed material; and one or more environmental parameters including at least one of an ambient temperature, an ambient humidity, or an air circulation.

16. The 3D printing system of claim 15, wherein the one or more cameras take 5-way images, which includes front, back, left, right, and top images of the object.

17. The 3D printing system of claim 16, wherein the 5-way images are processed by the main controller based on a machine learning algorithm.

18. The 3D printing system of claim 17, wherein the machine learning algorithm is based on at least one of a convolutional neural network (CNN) or a recurrent neural network (RNN).

19. The 3D printing system of claim 15, wherein the one or more environmental parameters are monitored at least intermittently.

20. The 3D printing system of claim 19, wherein the one or more environmental parameters are monitored at regular intervals.

\* \* \* \* \*